United States Patent [19]

Westerdahl

[11] 4,236,275
[45] Dec. 2, 1980

[54] PROCESS FOR THE FILLETING OF FISH

[75] Inventor: Henri Westerdahl, Rønne, Denmark

[73] Assignee: Nordischer Maschinenbau Rud. Baader GmbH & Co. KG, Lubeck, Fed. Rep. of Germany

[21] Appl. No.: 966,815

[22] Filed: Dec. 6, 1978

[51] Int. Cl.³ .............................................. A22C 25/16
[52] U.S. Cl. ........................................... 17/46; 17/57
[58] Field of Search ................... 17/57, 45, 54, 55, 56, 17/60, 61

[56] References Cited

U.S. PATENT DOCUMENTS

| 2,704,378 | 3/1955 | Schlichting | 17/54 |
| 3,309,730 | 3/1967 | Michael | 17/54 |

Primary Examiner—Willie G. Abercrombie
Attorney, Agent, or Firm—Edward F. Levy

[57] ABSTRACT

A process for filleting unbeheaded fish, or beheaded fish with the collar bones still adhering to the body to be filleted conveyed tail forward comprises performing belly filleting cuts, back filleting cuts and rib cuts. The fillets are cut free by severing cuts, performed after the rib cuts, extending closely behind the collar bones, and inclined towards the roof or the skull, while leaving the collar bones and/or the head on the bone skeleton. An apparatus for filleting the fish comprises a conveyor for the fish, a pair of belly filleting knives, a pair of back filleting knives and a pair of rib knives. The axes of the rib knives are arranged almost parallel to each other and inclined in the feed direction of the conveyor. The rib knives are displaceable in the direction of their axes and connected with control means to raise them at least on the arrival of the abdominal cavity end of each fish.

4 Claims, 3 Drawing Figures

U.S. Patent    Dec. 2, 1980    4,236,275
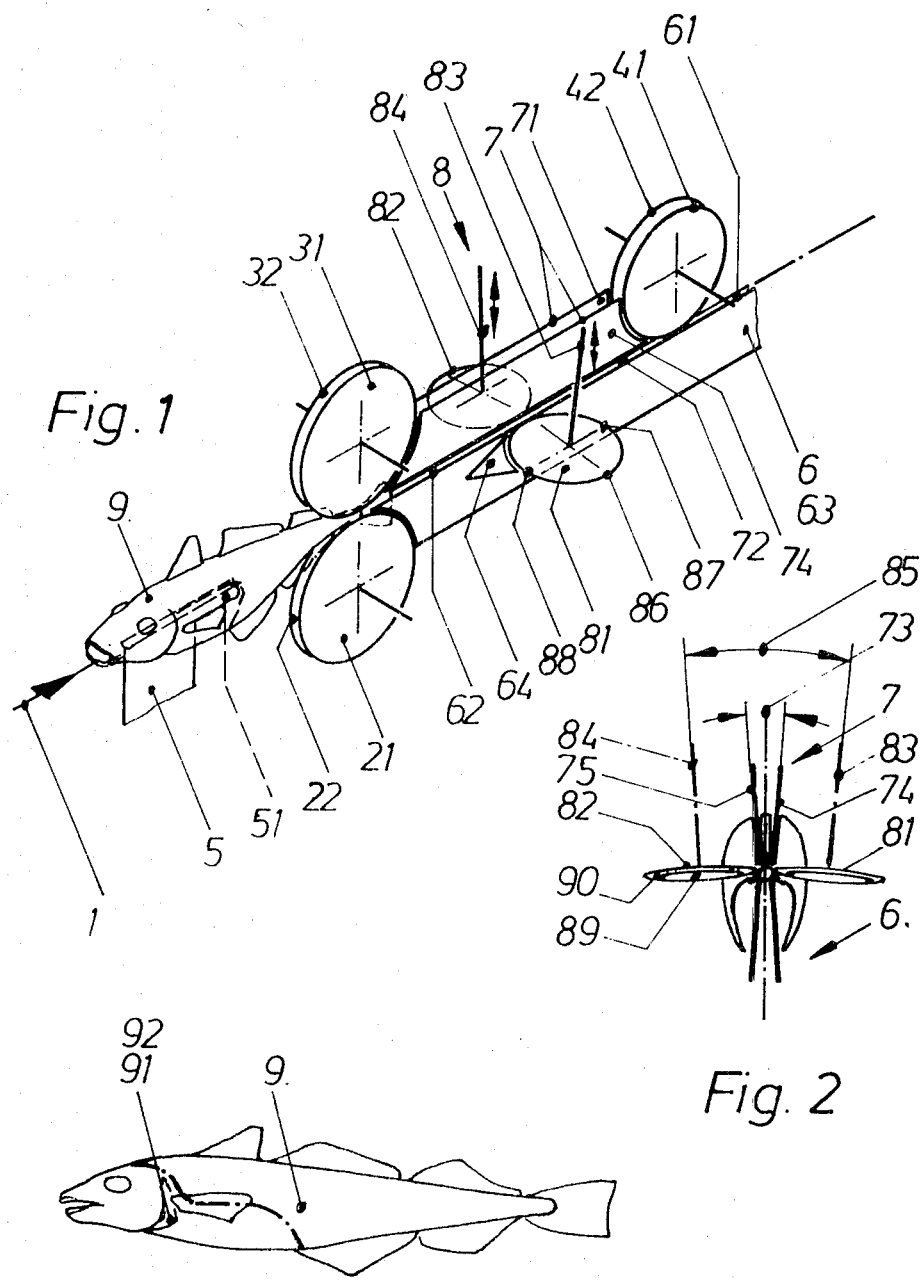

PROCESS FOR THE FILLETING OF FISH

BACKGROUND OF THE INVENTION

1. Field of Invention

The present invention relates to a process for the filleting of unbeheaded fish or of beheaded fish with the collar bones still adhering to the body to be filleted comprising the steps of performing belly filleting cuts, back filleting cuts and rib cuts on a fish conveyed with its tail end leading, and to an apparatus for performing such process.

2. Description of Prior Art

NO-PS 124 348 discloses a process for the beheading or the severing of the collar bones of fish conveyed in their longitudinal direction tail forward, by means of a pair of circular blades which are movable up and down and oblique to each other with their cutting edges against the feed direction of the fish.

In this process a beheading machine is not required and personnel for loading a beheading machine with fish are therefore not needed. Also a cutting location, which arises on the beheading of the fish at its head end and at which the danger of bacterial infection or mildew occurring exists with the intermediate storage of the fish before filleting, is not required. However, a major disadvantage is that a special tool for the severing of the head or the collar bones and special measuring and control devices for the actuation of the tool are required for the performance of the process. Since the transport of the fish past the tool for the severing of the head takes place by means of a push saddle, it is not possible to decapitate smaller fish, the gill chambers of which are still disposed in the range of the thrust saddle.

3. Object of Invention

It is one object of the present invention to be able to cut free the fillets from small fish at a high yield of fish meat without necessitating an additional tool.

SUMMARY OF THE INVENTION

According to one aspect of the present invention there is provided a method of filleting unbeheaded fish or beheaded fish with the collar bones still adhering to the body to be filleted, comprising the steps of performing belly filleting cuts, back filleting cuts and rib cuts on a fish conveyed with its tail end leading, wherein after performing the rib cuts the fillets are severed from the fish by cutting the fish adjacent the collar bones and in a direction inclined towards the roof of the skull leaving the collar bone and/or the head on the remaining bone skeleton.

Each rib cut may comprise an arcuate cut starting at the end of the abdominal cavity and a straight cut extending above one of the ribs and the vertebral projections, said straight cut communicating with a severing cut. Thereby, parting of the fillet from the bone skeleton behind the collar bone is made possible.

Preferably each rib cut is guided above the flesh bones up to the collar bone and is continued beyond the collar bone as the severing cut, thus separating the fillet from the belly flap. This obviates the need for special tools for carrying out severing cuts.

The rib cuts may enclose an angle of less than 180° towards the belly side of the fish while leaving the thin parts of the belly lobes on the bone skeleton. This makes the economical production of fillets free of flesh bones possible, even from small fish.

According to another aspect of the present invention there is provided an apparatus for filleting unbeheaded fish, or beheaded fish with the collar bones still adhering to the body to be filleted, comprising conveyor means to convey the fish, a pair of belly filleting knives, a pair of back filleting knives, and a pair of rotatable rib cutting knives, wherein the axes of rotation of the rib cutting knives are almost parallel to each other and inclined in the conveying direction, each rib cutting knife is displaceable in a direction parallel to its axis of rotation, and control means are provided operable to displace the rib cutting knives in the direction of the dorsal side of the fish at least on the arrival of the abdominal cavity thereof. This apparatus enables the easy and quick performance of the afore described process.

Advantageously each rib cutting knife may be provided with a chamfer at the side thereof which in use faces the belly side of the fish. This safeguards a faultless function of the rib cutters.

Support means may be disposed upstream of the rib cutting knives adjacent the cutting edges thereof. Thereby, the cutting effect of the rib cutting knives is restricted to the region of the abdominal cavity. Such support means may be arranged either fixed to the apparatus or to yield upon respective control.

The conveyor means may comprise a plurality of saddle members each arranged to convey a respective fish and to actuate the control means. The control means may be actuated synchronously with the saddle tip. Thereby, control of the rib knives is made possible in a simple manner.

BRIEF DESCRIPTION OF THE DRAWINGS

An embodiment of the present invention will now be described in greater detail by way of example and with reference to the accompanying drawings in which:

FIG. 1 shows an axonometric illustration of an apparatus embodying the present invention, FIG. 2 shows a cross-section through the apparatus shown in FIG. 1 at the level of the rib cutting knives for performing the lateral cuts, and FIG. 3 shows a fish with cutting lines of said lateral cuts illustrated thereon.

DESCRIPTION OF THE PREFERRED EMBODIMENTS

Referring now to the accompanying drawings, a fish travels along a path 1, with its backbone coinciding with the line, in the direction of the arrow indicated in the line. The path is disposed in a frame (not shown) of a filleting machine for fish. Disposed above and below the path 1 are respective pairs of rotatably driven belly filleting knives 21 and 22, back filleting knives 31 and 32 and severing knives 41 and 42. Such tools as well as any guides which may also be necessary are well known in fish filleting machines. The fish is conveyed along the path 1 by means of push saddles 51, which are provided by way of example for different kinds of conveyors 5, such as tail clamps or endless entraining belts engaging at the flanks of the fish, and of which only one push saddle is illustrated. Downstream of and in the cutting plane of the pairs of belly filleting knives 21 and 22 and back filleting knives 31 and 32 are pairs of mutually inclined lower and upper bone guides 6 and 7 which engage into the belly and back filleting cuts and which each in the region of their upper and lower edges have gaps 61 and 71 for the passage of the belly and back spines respectively of the bone skeleton. Also there is a vertical gap 72 between them for the passage of the lateral vertebral projections or ribs. Between the pair of back filleting knives 31 and 32 and the pair of severing knives 41 and 42 there is a rib cutter 8 comprising a pair of rib cutting knives 81 and 82 which are rotatable about axes 83 and 84 and which are displaceable axially. The axes include an angle 85 corresponding to the angle of inclination 73 of the upper bone guides 7. Each rib knife and its associated axis is also so inclined that the downstream portion 87 of the blade is lower than the upstream portion 88 and is so arranged that that portion of each blade 86 which faces the bone guides, in the lowermost setting of the respective circular knife lies just below the upper edges 62 of the lower bone guide 6 and almost touches the plane of the outer surface 74 thereof. Upstream of each knife 81 and 82 is a cutting support 64 which is fast with the apparatus and which covers the upstream portion 88 of the peripheral edge of the knife 81 in the lowermost setting of the knives. Each of the knives 81 and 82 at its underside 89 has a bevel or chamfer 90 forming the peripheral edge 86 and is controlled in the height position of its cutting plane by control means (not shown) which are synchronised with the movement of the conveying means and actuated in dependance on the setting of the entraining members of the conveyor. Control means of this type are conventional and well known, and may comprise cam means operable in synchronization with travel of the fish carried by the push saddle, as shown in U.S. Pat. No. 3,309,730, issued Mar. 21, 1967.

The apparatus operates as follows:

An unbeheaded, but degutted fish 9 is placed by its abdominal cavity on the saddle 51 of an endless circulating push saddled chain and conveyed by the saddle 51 to the pairs of belly filleting knives 21 and 22 and back filleting knives 31 and 32 which open the fish at its belly and back side respectively by filleting cuts guided to both sides of the spokes. The back filleting cuts can extend up to and through the skull of the fish, but they may also be interrupted by driving out the back filleting knives at the head end of the abdominal cavity. In its further advancing movement, the fish guided by means of the upper and lower bone guides 7 and 6, respectively, into the back and belly filleting cuts engages the knives 81 and 82 of the rib cutter 8, the effective circumferential edges 86 of which are, however, covered in their lower setting by the cutting supports 64 so that the fillet halves at the belly side are conducted away over the knives 81 and 82. On entry of the tip of the push saddle 51 into the region of the rib cutters 8, the rib knives 81 and 82 are displaced axially upwardly into a cutting plane, which selectively extends just above the vertebral projections or the flesh bones (pin bones). Thereby the displacement of the rib knives 81 and 82 may take place, this displacement being effected, for example, by means of a cam synchronized with regard to the drive assembly of the push saddle. By reason of their rearwardly inclined position and/or the chamfer 90 at their lower side 89, each circular knife 81 and 82 is deflected on engaging the rear edge 92 of the collar bone 91 (supraclavicula) and the os posttemporale forming one lateral skull bone and is displaced upwardly so that the cut extends over the os occipitale closing the skull off upwardly. The fillets thus gained are selectively free of bones or pinbones. The bone skeleton carrying the head can while maintaining the saddling-up be conducted to further tools which for example make the detaching of the belly lobes possible by cutting or scraping or permit the obtaining of the collar bones with the flesh adhering to them. To make the displacement of the rib cutting knives 81 and 82 more certain, these can be actuated shortly before the start of the deflecting motion in the sense of a weight compensation.

A major advantage of the invention and thus of the embodiment described above by way of example is that beheading of even small fish or severing of their collar bones is not necessary before filleting so that the cost incurred with a beheading machine and its operation can be saved.

What is claimed is:

1. A method of mechanically filleting unbeheaded fish, or beheaded fish with the collar bones still adhering to the body to be filleted, comprising the steps of conveying a fish with its tail end leading through a succession of cutting knives, performing belly filleting cuts, back filleting cuts and rib cuts on said fish, performing said rib cuts by rib knives which are displaceable in a direction perpendicular to their cutting planes, and thereafter severing the fillets from the fish by displacing said rib knives in a direction to cut the fish adjacent the collar bones and in a direction inclined towards the roof of the skull leaving the collar bone and/or the head on the remaining bone skeleton.

2. A method as claimed in claim 1, wherein each rib cut comprises an arcuate cut starting at the end of the abdominal cavity and a straight cut extending above one of the ribs and the vertebral projections, said straight cut communicating with a severing cut.

3. A method as claimed in either claim 1 or claim 2, wherein each rib cut is guided above the flesh bones up to the collar bone and is continued beyond the collar bone as the severing cut, thus separating the fillet from the belly flap.

4. A process as claimed in any one of the preceding claims, wherein the rib cuts enclose an angle of less than 180° towards the belly side of the fish while leaving the belly flaps on the bone skeleton.

* * * * *